UNITED STATES PATENT OFFICE.

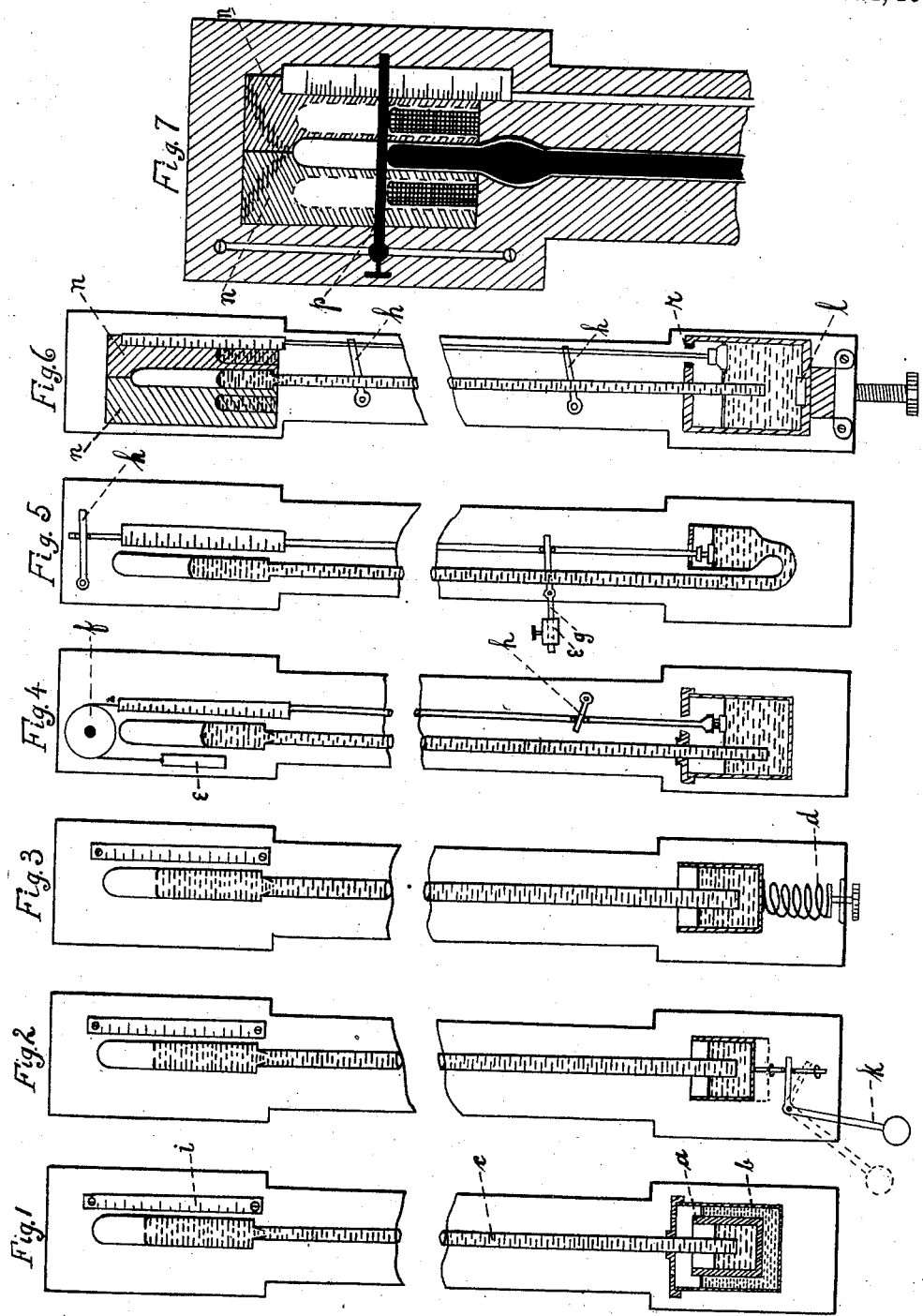

WILHELM SCHOCKE, OF CASSEL, GERMANY.

BAROMETER.

984,972. Specification of Letters Patent. Patented Feb. 21, 1911.

Application filed February 21, 1910. Serial No. 545,192.

*To all whom it may concern:*

Be it known that I, WILHELM SCHOCKE, a subject of the German Emperor, residing at Cassel, in the Province of Hesse - Nassau, Kingdom of Prussia, and Empire of Germany, have invented new and useful Improvements in Barometers, of which the following is a specification.

In order to find out the exact mercury level in the barometers used at the present time it is necessary to purposely regulate the scale every time we intend to read off, as the surface of the mercury in the mercury container known as the "lower mercury level" which represents the zero point on the scale is not always of the same height, it being raised by the entrance of mercury into the container while the column of mercury is falling, and being lowered when the column of mercury is rising.

My invention avoids that previously necessary adjustment of the scale by variably positioning the scale or vessel and by compensating the differences of height of the lower mercury level, so that there is an automatic regulation whereby mistakes in the indication of the upper level upon the scale are avoided.

Figures 1, 2, 3, of the accompanying drawing indicate a device showing the vessel containing the mercury in a movable condition. Figs. 4, 5, 6 illustrate a movable condition of the scale. Fig. 7 represents a very practical suggestion for the demarkation of the upper mercury level upon the scale.

According to Fig. 1 a firm zero point is obtained by having the mercury container floating in a jar filled with any fluid for example glycerin. According to the variation of the pressure of the atmosphere the quantity of mercury in the container will be increased or diminished by the quantity of mercury that will rise in or fall from the column of mercury in the tube. The container therefore loses or gains in weight.

Taking into consideration the specific gravity of the fluid in the jar, $b$, and the proper circumference and horizontal cross section of the bottom of the mercury container, $a$, an equilibrium may be established, so, that by a diminution of weight of the mercury container it is raised and by an increase of weight of the mercury container it is lowered and the decrease or increase in its weight will amount to exactly as much as is necessary to obtain the same lower mercury level at all times thus obtaining a stable zero point for the scale. In this case it is not necessary that the scale should be movable. The same result is obtained if the mercury container, $a$, is mounted upon a weighted lever, $k$, Fig. 2, acting at the end of the lever or upon a spring, $d$, Fig. 3. If care is taken in calculating exactly the weight to act upon the lever or the force of the spring (Fig. 3) the result will be, that irrespective of the increase or decrease of the volume and weight of the mercury in the container the height of the lower mercury level will remain the same. If in the other way the scale is brought into a movable position as illustrated in Figs. 4, 5, 6 it is clear that, although the differences in the heights of the lower mercury level are not avoided, they will in no way interfere in the indication of the level of the mercury column, because the scale itself is floating in the mercury of the mercury container, and by being raised or lowered it regulates automatically the position of the scale and with it the zero point by direct transmission.

The mercury container can be movable. It is sufficient that the scale is floating upon or in the mercury. The end of the scale acting as float, is made from or covered by a material to which mercury adheres and the size is proportioned to correspond to the weight of the scale.

In order to diminish the weight of the scale as much as possible counterweights, $e$, Fig. 4 and Fig. 5, can be used, brought into action by the help of a grooved wheel, $f$, as shown in Fig. 4 or a lever, $g$, as shown in Fig. 5. The grinding of the scale in general is best controlled by guides, $h$, Figs. 4–6, which move very easily.

At the time of shipping it is necessary to close the opening in the mercury container in which the scale normally moves freely. In order to prevent the escape of mercury during shipment the scale with its reinforced end Fig. 6 is pulled upward into the opening of the cover of the mercury container where it meets with a rubber ring, $r$, and closes tightly.

The tube in which the mercury column is situated is closed in the usual way by a rubber pad, $l$, Fig. 6.

In barometers used before one straight mirror placed behind the enlarged upper end of the mercury tube was used for better recognition of the summit of the mercury column. In this mirror we see the empty part of the glass tube and the observer is forced to bring his eye exactly into the same height of the real mercury summit in order to avoid mistakes in the fixation of the horizontal bar, $p$, Fig. 7, the lower edge of which seems to touch the summits which appear one behind the other.

Instead of a straight mirror in the back as mentioned above I invented the application of one or better two angularly directed mirrors postero-laterally arranged, $n$—$n$, Fig. 6 and Fig. 7, for better indication which make visible the reflected summits laterally to the true mercury summit. In this way we can much more clearly and easily see one or more summits to the side of the column in this angular mirror and the summit is much more accurately indicated than in a straight mirror placed straight behind the column.

Having now fully described my invention I claim:

1. In combination, a barometer having a tube and a mercury container, and a scale for indicating the height of the mercury in the tube, and means whereby the relative position of the scale and container are automatically varied upon variation of the amount of mercury in the container, due to the height of mercury in the column by means of which variable position the rising and falling of the mercury level in the container is self regulated by compensation of the mercury entering the container from the tube or leaving it into the tube thus saving a special adjustment or pair of readings before every separate determination of the real mercury level substantially as described and shown and for the purpose set forth.

2. In combination, a barometer having a tube and a mercury container, and a scale for indicating the height of the mercury in the tube, said scale at its lower end floating upon or in the mercury of the mercury container, the relative position of the floating scale being automatically varied upon variation of the amount of mercury in the container, due to the height of mercury in the column by means of which variable position an automatic regulation of the zero point for the scale is obtained by direct transmission, thus saving a special adjustment or pair of readings before every separate determination of the real mercury level substantially as described and shown and for the purpose set forth.

3. In combination, a barometer having a tube and a scale for indicating the height of the mercury in the tube and provided with a reinforced end, and a mercury container provided with an opening for the free passage of the scale, said reinforced end of the scale tightly fitting into said opening of the container and means coöperating with the said re-inforced end for preventing the escape of mercury during shipment substantially as described and shown.

4. In combination a mercurial barometer having a tube and a scale for indicating the height of the mercury in the tube and mirrors for producing reflection of the true summit of the mercury column, said mirror placed in an angular direction postero-laterally and parallel to the tube and mercury column by means of which angular direction of the mirrors the reflected summits of the mercury column appear laterally to the mercury tube substantially as described and shown and for the purpose set forth.

WILHELM SCHOCKE.

Witnesses:
AUGUST BETHGE,
JANS FLINDMER.